(12) United States Patent
Williams et al.

(10) Patent No.: US 9,819,236 B2
(45) Date of Patent: Nov. 14, 2017

(54) METHODS FOR COUPLING PERMANENT MAGNETS TO A ROTOR BODY OF AN ELECTRIC MOTOR

(71) Applicant: CANRIG DRILLING TECHNOLOGIY LTD., Houston, TX (US)

(72) Inventors: Kevin Williams, Cypress, TX (US); Charles Patrick, Houston, TX (US)

(73) Assignee: Canrig Drilling Technology Ltd., Houstom, TX (US)

( * ) Notice: Subject to any disclaimer, the term of this patent is extended or adjusted under 35 U.S.C. 154(b) by 338 days.

(21) Appl. No.: 14/611,747

(22) Filed: Feb. 2, 2015

(65) Prior Publication Data

US 2015/0222154 A1    Aug. 6, 2015

Related U.S. Application Data

(60) Provisional application No. 61/935,185, filed on Feb. 3, 2014.

(51) Int. Cl.
*H02K 15/02*    (2006.01)
*H02K 1/27*    (2006.01)

(52) U.S. Cl.
CPC ........ *H02K 1/278* (2013.01); *Y10T 29/49012* (2015.01)

(58) Field of Classification Search
CPC ........ H02K 1/278; H02K 15/03; H02K 21/46; Y10T 29/49012
See application file for complete search history.

(56) References Cited

U.S. PATENT DOCUMENTS

| 2,709,284 | A | 5/1955 | Evans et al. |
| 3,231,803 | A | 1/1966 | Pryor et al. |
| 3,653,636 | A | 4/1972 | Burrell |

(Continued)

FOREIGN PATENT DOCUMENTS

| WO | 8908941 A1 | 9/1989 |
| WO | 00/76054 A1 | 12/2000 |
| WO | 2005021927 A1 | 3/2005 |

OTHER PUBLICATIONS

Office Action issued in U.S. Appl. No. 12/629,354 dated Dec. 19, 2011 (11 pages).

(Continued)

*Primary Examiner* — Minh Trinh
(74) *Attorney, Agent, or Firm* — Adolph Locklar

(57) ABSTRACT

A method for coupling a permanent magnet to a rotor body of an electric motor includes providing a rotor body having an outer surface. A mounting hole is formed in the rotor body. A permanent magnet in the form of an annular section is provided. The concave surface of the permanent magnet has a diameter generally equal to the outer diameter of the rotor body. The permanent magnet has a hole formed therein to receive the threaded connector, the hole having a countersink at the convex surface of the permanent magnet. The permanent magnet is positioned on the outer surface of the rotor body such that the hole lines up with the mounting hole, an elastomeric body is positioned in the countersink, and the threaded connector is positioned through the elastomeric body and the hole of the permanent magnet to couple to the rotor body.

11 Claims, 3 Drawing Sheets

(56) References Cited

U.S. PATENT DOCUMENTS

| | | | |
|---|---|---|---|
| 4,046,355 A | 9/1977 | Martin | |
| 4,115,030 A | 9/1978 | Inagaki et al. | |
| 4,226,311 A | 10/1980 | Johnson et al. | |
| 4,242,057 A | 12/1980 | Bender | |
| 4,284,253 A | 8/1981 | Uribe | |
| 4,314,692 A | 2/1982 | Brauer et al. | |
| 4,438,904 A | 3/1984 | White | |
| 4,486,678 A * | 12/1984 | Olson | H02K 1/278 310/156.28 |
| 4,527,959 A | 7/1985 | Whiteman | |
| 4,545,017 A | 10/1985 | Richardson | |
| 4,545,567 A | 10/1985 | Telford et al. | |
| 4,549,341 A * | 10/1985 | Kasabian | H02K 1/278 29/598 |
| 4,700,092 A | 10/1987 | Bincoletto | |
| 4,910,790 A | 3/1990 | Kershaw | |
| 5,111,094 A | 5/1992 | Patel et al. | |
| 5,146,433 A | 9/1992 | Kosmala et al. | |
| 5,259,731 A | 11/1993 | Dhindsa et al. | |
| 5,306,124 A | 4/1994 | Back | |
| 5,331,238 A | 7/1994 | Johnsen | |
| 5,351,767 A | 10/1994 | Stogner et al. | |
| 5,375,098 A | 12/1994 | Malone et al. | |
| 5,616,009 A | 4/1997 | Birdwell | |
| 5,952,757 A | 9/1999 | Boyd, Jr. | |
| 6,029,951 A | 2/2000 | Guggari | |
| 6,094,024 A | 7/2000 | Westlake | |
| 6,182,945 B1 | 2/2001 | Dyer et al. | |
| 6,419,465 B1 | 7/2002 | Goettel et al. | |
| 6,577,483 B1 | 6/2003 | Steicher et al. | |
| 6,995,682 B1 | 2/2006 | Chen et al. | |
| 7,462,138 B2 | 12/2008 | Shetty et al. | |
| 7,549,467 B2 | 6/2009 | McDonald et al. | |
| 7,633,248 B1 | 12/2009 | Williams | |
| 7,737,592 B2 | 6/2010 | Makino et al. | |
| 7,851,962 B1 | 12/2010 | Williams | |
| 7,997,333 B2 * | 8/2011 | Angelle | E21B 19/07 166/77.52 |
| 8,368,276 B2 | 2/2013 | Wolf et al. | |
| 2002/0121823 A1 | 9/2002 | Gauthier | |
| 2004/0251766 A1 | 12/2004 | Komentani et al. | |
| 2004/0256110 A1 | 12/2004 | York et al. | |
| 2005/0206266 A1 | 9/2005 | Hans | |
| 2006/0017339 A1 | 1/2006 | Chordia et al. | |
| 2006/0049712 A1 | 3/2006 | Zepp et al. | |
| 2006/0066156 A1 | 3/2006 | Dong et al. | |
| 2006/0108881 A1 | 5/2006 | Hauger et al. | |
| 2006/0108890 A1 | 5/2006 | Hauger et al. | |
| 2006/0119197 A1 | 6/2006 | Puterbaugh et al. | |
| 2006/0133905 A1 | 6/2006 | Woodruff | |
| 2006/0175064 A1 | 8/2006 | Yuratich | |
| 2006/0181238 A1 | 8/2006 | Choi et al. | |
| 2007/0053780 A1 | 3/2007 | Ruffner et al. | |
| 2007/0114856 A1 | 5/2007 | Park | |
| 2007/0228862 A1 | 10/2007 | Welchko et al. | |
| 2007/0241627 A1 | 10/2007 | Kharsa | |
| 2007/0267222 A1 | 11/2007 | Howard, Jr. et al. | |
| 2008/0061645 A1 | 3/2008 | Yukitake | |
| 2008/0111434 A1 | 5/2008 | Head | |
| 2008/0116432 A1 | 5/2008 | Folk et al. | |
| 2008/0181798 A1 | 7/2008 | Folk et al. | |
| 2008/0203734 A1 | 8/2008 | Grimes et al. | |
| 2008/0265813 A1 | 10/2008 | Eschleman et al. | |
| 2008/0267785 A1 | 10/2008 | Cervenka et al. | |
| 2009/0267440 A1 | 10/2009 | Komentani et al. | |
| 2011/0295269 A1 | 12/2011 | Swensgard et al. | |
| 2011/0309315 A1 | 12/2011 | Williams | |
| 2013/0307357 A1 | 11/2013 | Maksumic et al. | |

OTHER PUBLICATIONS

Office Action issued in U.S. Appl. No. 12/629,354 dated Dec. 31, 2012 (11 pages).
Office Action issued in U.S. Appl. No. 12/629,354 dated Apr. 11, 2012 (11 pages).
Office Action issued in U.S. Appl. No. 12/876,673 dated Apr. 5, 2013 (12 pages).
Office Action issued in U.S. Appl. No. 12/876,673 dated Oct. 24, 2012 (14 pages).
Office Action issued in U.S. Appl. No. 12/643,439, dated Aug. 7, 2012 (21 pages).
Office Action issued in U.S. Appl. No. 12/643,439, dated Feb. 10, 2012 (20 pages).
Office Action issued in U.S. Appl. No. 13/126,319, dated Mar. 27, 2013 (5 pages).
Machine translation of WO8908941 dated Sep. 21, 1989 (2 pages).
International Preliminary Report on Patentability and Written Opinion issued in International Patent Application No. PCT/US2010/060943, dated Jul. 5, 2012 (8 pages).
For the American Heritage Dictionary definition: connected. (n.d.) The American Heritage Dictionary of the English Language, Fourth Edition. (2003). Retrieved Apr. 29, 2013 from http://www.thefreedictionary.com/connected.
For the American Heritage Dictionary definition: receiving. (n.d.) The American Heritage Dictionary of the English Language, Fourth Edition. (2003). Retrieved Apr. 30, 2013 from http://www.thefreedictionary.com/receiving.
For the American Heritage Dictionary definition: directly. (n.d.) The American Heritage Dictionary of the English Language, Fourth Edition. (2003). Retrieved Apr. 29, 2013 from http://www.thefreedictionary.com/directly.
International Search Report and Written Opinion issued in International Patent Application No. PCT/US2015/014091, dated May 14, 2015 (10 pages).

\* cited by examiner

METHODS FOR COUPLING PERMANENT MAGNETS TO A ROTOR BODY OF AN ELECTRIC MOTOR

CROSS-REFERENCE TO RELATED APPLICATIONS

This application is a non-provisional application which claims priority from U.S. provisional application No. 61/935,185, filed Feb. 3, 2014.

TECHNICAL FIELD/FIELD OF THE DISCLOSURE

The present disclosure relates generally to permanent magnet electric motors, and specifically to the bonding of permanent magnets to a rotor or stator of a permanent magnet electric motor.

BACKGROUND OF THE DISCLOSURE

In general, electric motors operate by rotating a rotor relative to a fixed stator by varying the orientation of a magnetic field induced by one or more coils. In some electric motors, both the rotor and stator include coils. In such an induction motor, the magnetic field induced by the stator coils induces current within the rotor coils which, due to Lenz's law, causes a resultant torque on the rotor, thus causing rotation.

In a permanent magnet motor, on the other hand, the rotor includes one or more permanent magnets. The permanent magnets, in attempting to align with the magnetic field induced by the coils in the stator, cause a resultant torque on the rotor. By varying the orientation of the magnetic field, the rotor may thus be caused to rotate. In high-torque permanent magnet motors, multiple permanent magnets may be positioned on the exterior of the rotor (for an internal rotor permanent magnet motor).

While in operation, the components of the permanent magnet motor may heat up in response to, for example, electrical resistance in the stator coils, losses in iron core of stator, induced currents in rotor caused by harmonics, mechanical friction, etc. Because of this increase in heat, the permanent magnets must be bonded to the rotor in such a way that any thermal expansion of the rotor or permanent magnets will not cause the permanent magnets to fracture or separate from the rotor. Additionally, in cases where the permanent magnets are formed by, for example, sintering, the permanent magnets themselves may be relatively brittle. Furthermore, where the permanent magnets are constructed of a material with a different thermal expansion coefficient than the rotor, as is often the case, the thermal expansion of the rotor may cause the permanent magnets to crack.

SUMMARY

The present disclosure provides for a method for coupling permanent magnets to a rotor. The method may include providing a rotor body, the rotor body being generally cylindrical in shape, the rotor body having an outer surface; forming a mounting hole in the rotor body, the mounting hole positioned to couple to a threaded connector; providing a permanent magnet, the permanent magnet being generally in the form of an annular section, the concave surface of the permanent magnet having a diameter generally equal to the outer diameter of the rotor body, the permanent magnet having a hole formed therein positioned to receive the threaded connector, the hole having a countersink formed therein at the convex surface of the permanent magnet; positioning the permanent magnet on the outer surface of the rotor body so that the hole of the permanent magnet is in alignment with the mounting hole; positioning an elastomeric body within the countersink; positioning the threaded connector through the elastomeric body and the hole of the permanent magnet; coupling the threaded connector to the rotor body.

The present disclosure also provides for a rotor for a permanent magnet electric motor. The rotor may include a rotor body, the rotor body being generally cylindrical in shape and having an outer surface. The rotor body may include a mounting hole positioned to couple to a threaded connector. The rotor may also include a permanent magnet. The permanent magnet may be generally in the form of an annular section. The concave surface of the permanent magnet may have a diameter generally equal to the outer diameter of the rotor body. The permanent magnet may have a hole formed therein positioned to receive the threaded connector. The hole may have a countersink formed therein at the convex surface of the permanent magnet. The rotor may also include an elastomeric body positioned within the countersink between the threaded connector and the permanent magnet.

The present disclosure also provides for a method. The method may include providing a rotor body. The rotor body may be generally cylindrical in shape. The rotor body may have an outer surface. The outer surface of the rotor body may have at least one dovetail channel. The method may also include providing a permanent magnet. The permanent magnet may be generally in the form of an annular section. The concave surface of the permanent magnet may have a diameter generally equal to the outer diameter of the rotor body. The permanent magnet may include at least one dovetail adapted to fit into the dovetail channel. The method may further include sliding the permanent magnet on the outer surface of the rotor body so that the dovetail couples to the dovetail channel.

The present disclosure also provides for a method. The method may include providing a rotor body. The rotor body may be generally cylindrical in shape. The rotor body may have an outer surface. The method may further include providing a retaining ring. The method may further include providing a permanent magnet. The permanent magnet may generally be in the form of an annular section. The concave surface of the permanent magnet may have a diameter generally equal to the outer diameter of the rotor body. The permanent magnet may have at least one flange extending from an end of the permanent magnet. The flange may be adapted to allow the retaining ring to hold the permanent magnet to the rotor body by compressing the flange to the rotor body. The method may further include positioning the permanent magnet on the outer surface of the rotor body. The method may further include positioning the retaining ring about the rotor body and permanent magnet such that the retaining ring is generally aligned with the flange.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
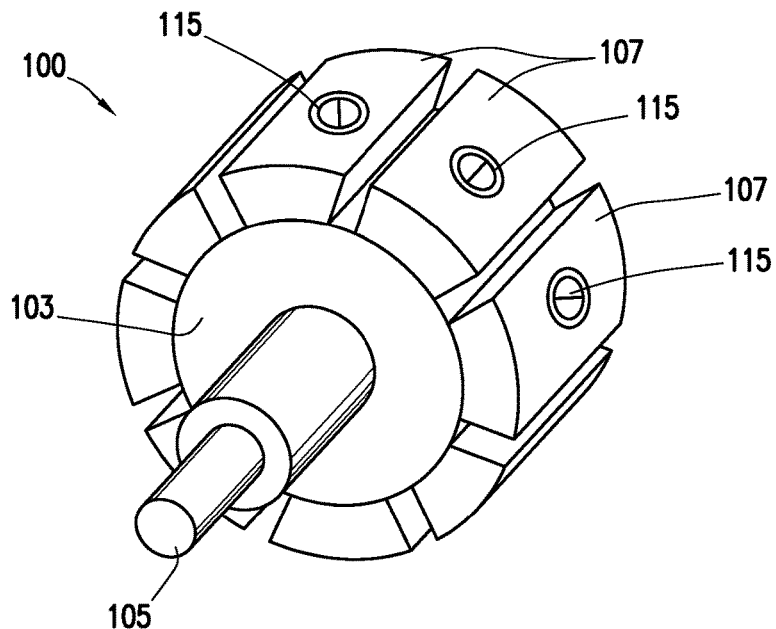
FIG. 1 depicts a rotor having permanent magnets affixed thereto consistent with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As depicted in FIG. 1, rotor 101 for use in a permanent magnet motor may include rotor body 103. Rotor body 103 may be generally cylindrical in shape. In some embodiments, rotor body 103 may be coupled to output shaft 105. As rotor 101 is rotated within the permanent magnet motor, output shaft 105 serves to transfer the rotational power generated by rotor 101 to other equipment (not shown).

Rotor 101 may, in some embodiments, include one or more permanent magnets 107 positioned about the exterior surface of rotor body 103. In some embodiments, as depicted in FIG. 1, permanent magnets 107 may be annular in shape. The concave surface of each permanent magnet 107 may have generally the same diameter as the exterior surface of rotor body 103. Permanent magnets 107 may be configured such that the magnetic axis of each permanent magnet is substantially aligned to be normal to the surface of rotor body 103. In some embodiments, the magnetic field of adjacent permanent magnets 107 are in opposition, so that the magnetic pole of permanent magnets 107 alternate between North and South. In some embodiments, permanent magnets 107 may be formed by sintering of permanent magnet material such as, for example and without limitation, a rare-earth magnet such as neodymium. In other embodiments, permanent magnets 107 may be formed by a rapid solidification process as understood in the art.

Figure 2:
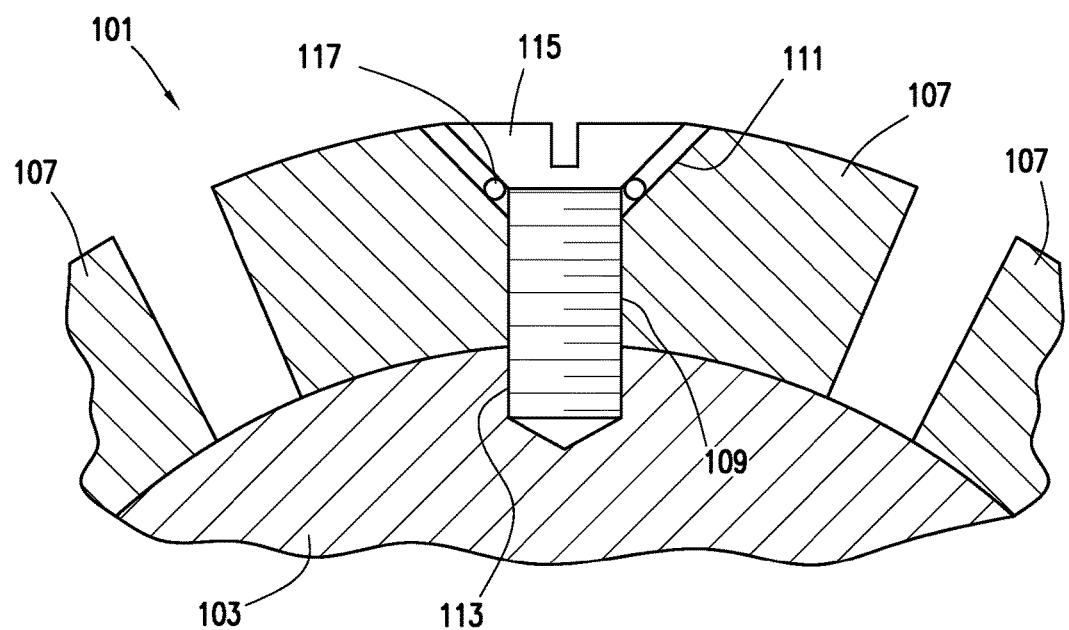
FIG. 2 depicts a partial cross section of the rotor of FIG. 1.

As depicted in FIG. 2, permanent magnet 107 may be coupled to rotor body 103. In some embodiments, permanent magnet 107 may have one or more holes 109 formed therein. Hole 109 is aligned so that when permanent magnet 107 is placed on the outer surface of rotor body 103, hole 109 extends in a direction normal to the surface of rotor body 103. In some embodiments, hole 109 may include countersink 111. Rotor body 103 may include one or more mounting holes 113 positioned to align with holes 109 of permanent magnets 107. In some embodiments, mounting holes 113 may be tapped to accept the thread of threaded fastener 115. In some embodiments, threaded fastener 115 may be, for example and without limitation, a screw, bolt, or other threaded fastener. Countersink 111 may allow threaded fastener 115 to, when installed, remain below the outer surface of permanent magnet 107 which may, for example, avoid interference between threaded fastener 115 and other parts of the permanent magnet motor.

In some embodiments, a thread-locking compound may be applied to threaded fastener 115 to, for example, prevent threaded fastener 115 from unintentionally unthreading from rotor body 103. In some embodiments, a potting material or adhesive may be applied between, for example, rotor body 103 and permanent magnet 107.

In the embodiment depicted in FIG. 2, threaded fastener 115 is a flathead screw with a matching tapered profile to that of countersink 111. One having ordinary skill in the art with the benefit of this disclosure will understand that threaded fastener 115 may be replaced by a threaded connector having a different profile without deviating from the scope of this disclosure. Likewise, countersink 111 may have a different profile such as, for example and without limitation, a counterbore without deviating from the scope of this disclosure. For the purposes of this disclosure, the term "countersink" is intended to include both countersinks and counterbores unless specifically differentiated.

In some embodiments, elastomeric body 117 may be positioned between the head of threaded fastener 115 and permanent magnet 107 when permanent magnet 107 is installed to rotor body 103. Elastomeric body 117 may be formed of an elastomeric material, allowing elastomeric body 117 to be installed under elastic compression between threaded fastener 115 and permanent magnet 107. Because threaded fastener 115 may have a thermal expansion coefficient and/or thermal conductivity different from that of permanent magnet 107, threaded fastener 115 may thermally expand and increase in length more rapidly than permanent magnet 107 as permanent magnet 107, threaded fastener 115, and rotor body 103 increase in temperature during normal use. In such a case, the compressive stress on elastomeric body 117 between threaded fastener 115 and permanent magnet 107 may decrease. Elastomeric body 117, being elastically deformed, increases in size as the stress thereon decreases, which may maintain the compressive force between threaded fastener 115 and permanent magnet 107. Elastomeric body 117 may thus, for example, prevent any loosening of the attachment between permanent magnet 107 and rotor body 103.

Although depicted as a single O-ring, elastomeric body 117 may, in some embodiments, be, for example and without limitation, a single O-ring, multiple O-rings, an elastomeric washer, or a combination thereof.

Likewise, as threaded fastener 115 and permanent magnet 107 decrease in temperature during normal operation of the permanent magnet motor, for example when the permanent magnet motor is shut off, threaded fastener 115 may thermally contract more rapidly than permanent magnet 107. In this case, the compressive stress on elastomeric body 117 between threaded fastener 115 and permanent magnet 107 may increase. Elastomeric body 117 may elastically deform to, for example, prevent excess force from being exerted on permanent magnet 107 by threaded fastener 115. Elastomeric body 117 may thus, for example, prevent threaded fastener 115 from crushing permanent magnet 107.

In order to assemble rotor 101, a rotor body 103 may be provided. One or more mounting holes 113 may be formed in the exterior surface of rotor body 103. In some embodiments, mounting holes 113 may be tapped to receive a threaded fastener. One or more permanent magnets 107, having at least one hole 109 formed therein, each hole 109 positioned to align with a corresponding mounting hole 113, each hole 109 having countersink 111, is then positioned onto the outer surface of rotor body 103. Elastomeric body 117 is then placed within countersink 111. A threaded fastener, such as threaded fastener 115, is then threaded into hole 109 and mounting hole 113, such that the head of threaded fastener 115 mechanically couples permanent magnet 107 to rotor body 103.

Although FIG. 1 depicts a permanent magnet 107 being coupled to rotor body 103 by only one threaded fastener 115, one having ordinary skill in the art with the benefit of this disclosure will understand that multiple screws 115 may be utilized for each permanent magnet 107. Additionally, although depicted as being used for an internal rotor permanent magnet motor, one having ordinary skill in the art with the benefit of this disclosure will understand that permanent magnets 107 may be installed to the interior surface of a tubular rotor of an external rotor permanent magnet motor without deviating from the scope of this disclosure. Likewise, although described with permanent magnets 107 coupled to the rotor of a permanent magnet motor, permanent magnets 107 may be coupled to the stator of a permanent magnet motor in which the coils are positioned on the rotor without deviating from the scope of this disclosure.

Figure 3:
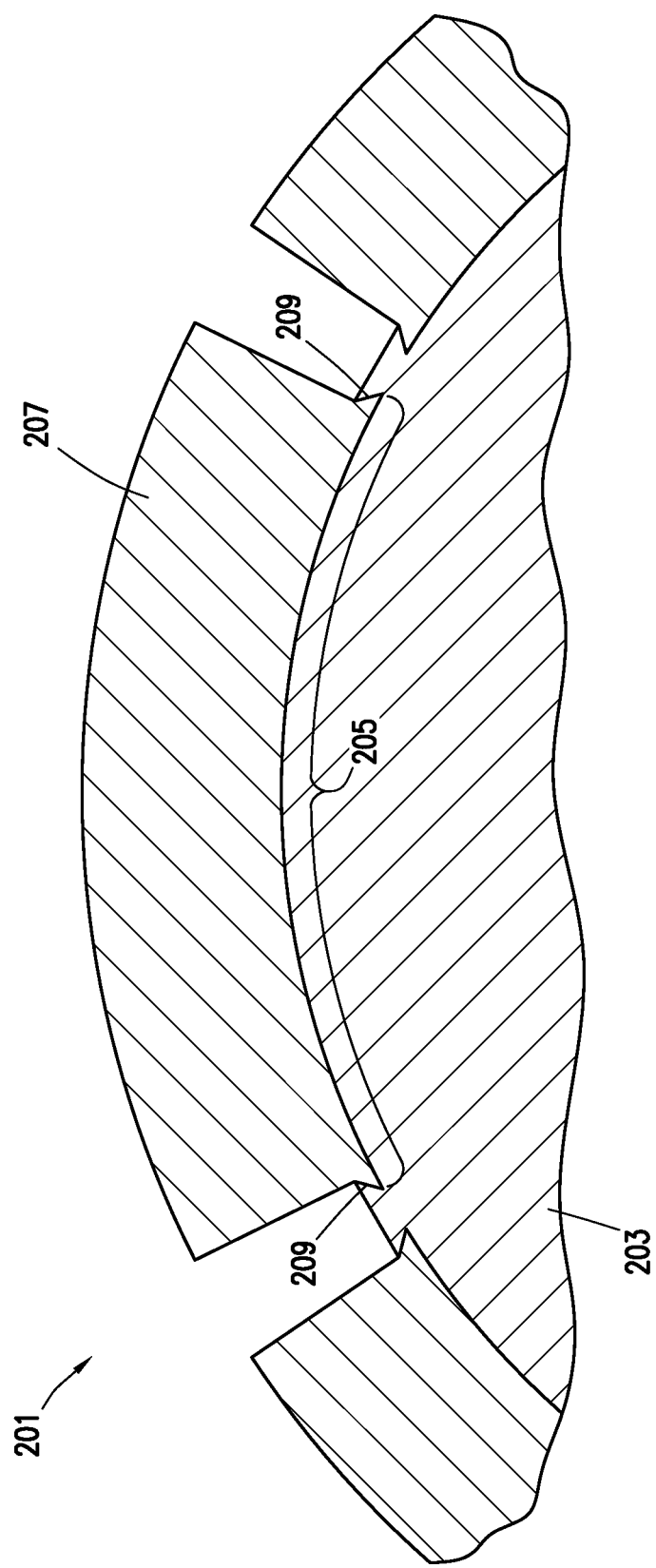
FIG. 3 depicts a partial cross section of a rotor having permanent magnets affixed thereto consistent with embodiments of the present disclosure.

In some embodiments, rotor 201 may include rotor body 203 as depicted in FIG. 3. Rotor body 203 may include one or more dovetail channels 205 adapted to interface with permanent magnets 207. In such embodiments, permanent magnets 207 may include magnet dovetail 209 adapted to fit into dovetails 205 and thus retain permanent magnet 207 to rotor body 203. In such an embodiment, permanent magnet 207 may be slid into dovetail channels 205 during assembly. In some embodiments, dovetail channels 205 may be formed by removing material from rotor body 203. In some embodiments, dovetail channels 205 may be formed as a separate piece from rotor body 203 and affixed thereto by, for example and without limitation, threaded couplers. In some embodiments, dovetail channels 205 may be coupled to rotor body 203 by threaded couplers as described above.

Figure 4A:
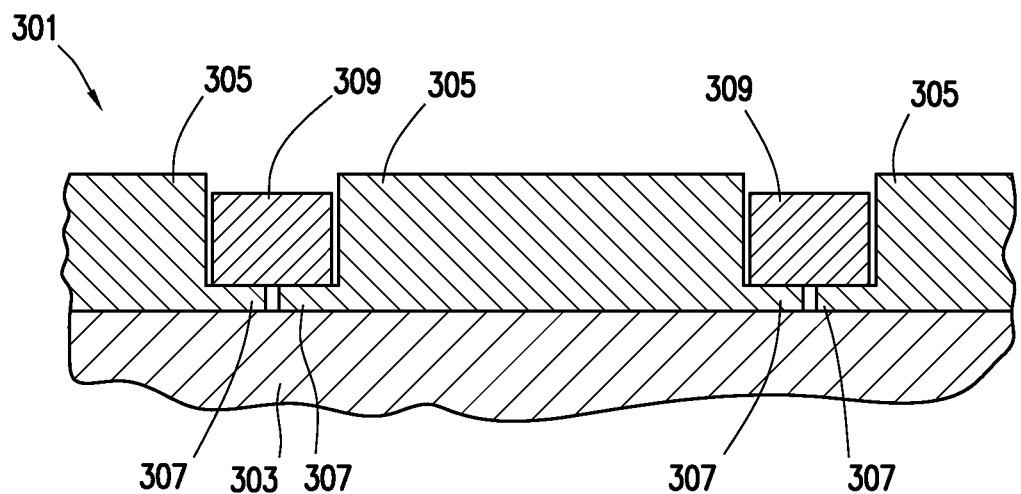
FIGS. 4a, 4b depict a rotor having permanent magnets affixed thereto consistent with embodiments of the present disclosure.
Figure 4B:
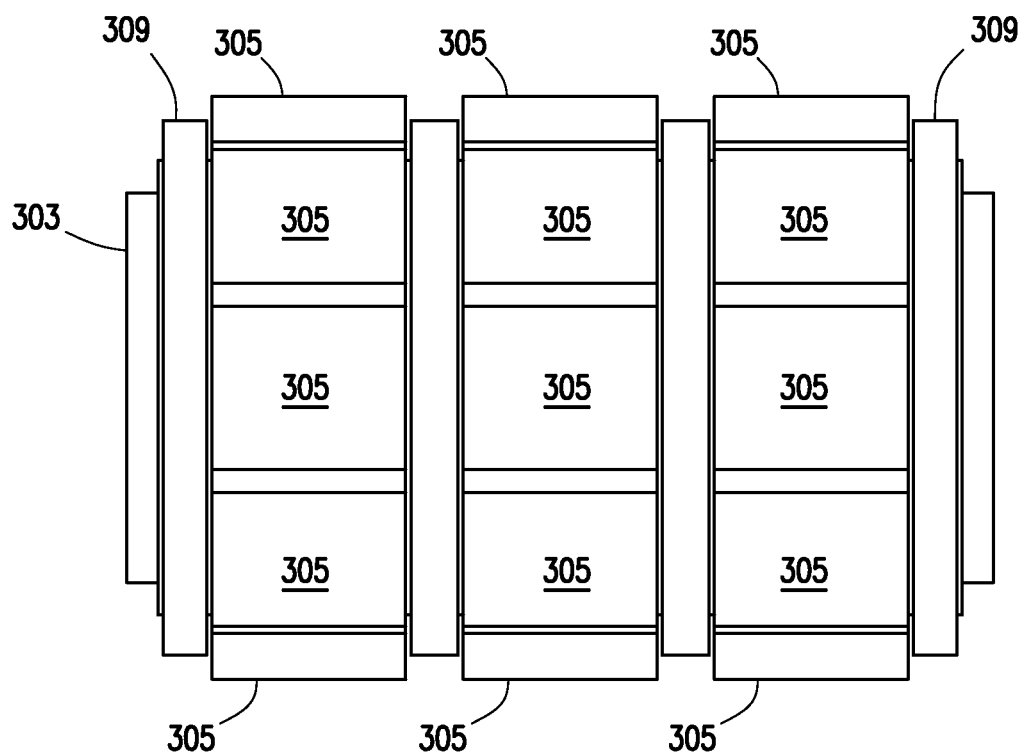

In some embodiments, rotor 301 may include rotor body 303 as depicted in FIGS. 4a, 4b. Permanent magnets 305 may include one or more flanges 307 as depicted in FIG. 4a. Flanges 307 may, for example and without limitation, be adapted to receive retaining ring 309 when installed as depicted in FIG. 4b. Retaining ring 309 may be adapted to encircle rotor body 303 and flanges 307 of permanent magnets 305 in order to retain permanent magnets 305 to rotor body 303. In some embodiments, retaining ring 309 may be a split ring, the ends of which being coupled to one or more of rotor body 303 or the other end of retaining ring 309.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:
   providing a rotor body, the rotor body being generally cylindrical in shape, the rotor body having an outer surface;
   forming a mounting hole in the rotor body, the mounting hole positioned to couple to a threaded connector;
   providing a permanent magnet, the permanent magnet being generally in the form of an annular section, the concave surface of the permanent magnet having a diameter generally equal to the outer diameter of the rotor body, the permanent magnet having a hole formed therein positioned to receive the threaded connector, the hole having a countersink formed therein at the convex surface of the permanent magnet;
   positioning the permanent magnet on the outer surface of the rotor body so that the hole of the permanent magnet is in alignment with the mounting hole;
   positioning an elastomeric body within the countersink;
   positioning the threaded connector through the elastomeric body and the hole of the permanent magnet;
   coupling the threaded connector to the rotor body.

2. The method of claim 1, wherein the mounting hole in the rotor body is at least partially threaded.

3. The method of claim 1, wherein the permanent magnet is formed by sintering of a permanent magnetic material.

4. The method of claim 3, wherein the hole and counterbore of the permanent magnet are formed during the sintering process.

5. The method of claim 1, wherein the threaded connector is a flathead screw having a screw head with a tapered outer surface, and the countersink is tapered to receive the flathead screw.

6. The method of claim 1, wherein the threaded connector comprises a screw having a screw head with a flat bottom, and the countersink is a counterbore having a flat surface.

7. The method of claim 1, wherein the elastomeric body comprises an O-ring.

8. The method of claim 1, wherein the elastomeric body comprises an elastomeric washer.

9. The method of claim 1, wherein the elastomeric body comprises two or more O-rings.

10. The method of claim 1, further comprising:
    applying a thread lock compound to the threaded connector.

11. The method of claim 1, wherein the permanent magnet further comprises a second hole, the second hole positioned to align with a second mounting hole formed in the rotor body.

* * * * *